United States Patent
Olson

(10) Patent No.: US 7,891,693 B2
(45) Date of Patent: Feb. 22, 2011

(54) HITCH FOR TWO DRAWPIN SIZES

(75) Inventor: Brian R. Olson, Fort Qu' Appelle (CA)

(73) Assignee: Power Pin Inc., Fort Qu' Appelle, Saskatchewan (CA)

( * ) Notice: Subject to any disclaimer, the term of this patent is extended or adjusted under 35 U.S.C. 154(b) by 261 days.

(21) Appl. No.: 12/241,452

(22) Filed: Sep. 30, 2008

(65) Prior Publication Data
US 2009/0102160 A1   Apr. 23, 2009

(30) Foreign Application Priority Data
Oct. 23, 2007   (CA) .................................. 2607412

(51) Int. Cl.
*B60D 1/02* (2006.01)
(52) U.S. Cl. ...................... 280/515; 280/416.1; 280/506
(58) Field of Classification Search ............. 280/415.1, 280/416.1, 504, 506, 507, 515
See application file for complete search history.

(56) References Cited

U.S. PATENT DOCUMENTS

| | | | | |
|---|---|---|---|---|
| 2,321,535 A | * | 6/1943 | Weiss | 280/506 |
| 2,360,335 A | * | 10/1944 | Fink | 280/506 |
| 2,371,662 A | * | 3/1945 | Winters | 280/506 |
| 2,697,618 A | * | 12/1954 | Hulstedt | 280/515 |
| 4,394,031 A | * | 7/1983 | Barton et al. | 280/515 |
| 4,552,377 A | * | 11/1985 | Folkerts | 280/515 |
| 4,774,823 A | * | 10/1988 | Callison | 70/14 |
| 5,671,938 A | | 9/1997 | Olson | |
| 2007/0052207 A1 | | 3/2007 | Olson | |
| 2007/0145719 A1 | * | 6/2007 | Heitlinger et al. | 280/507 |
| 2007/0176397 A1 | * | 8/2007 | Doubet et al. | 280/515 |

* cited by examiner

*Primary Examiner*—Lesley Morris
*Assistant Examiner*—Marc A Scharich
(74) *Attorney, Agent, or Firm*—King & Schickli, PLLC

(57) ABSTRACT

A hitch apparatus includes a hitch member defining a substantially vertical drawpin hole. A spacer member is movably mounted to the hitch member such that the spacer member is movable laterally from a working position, where the spacer extends forward to block a rear portion of the drawpin hole, to an idle position where the spacer is removed from the drawpin hole and the front end of the spacer is located lateral to the drawpin. A lock mechanism is operative to selectively maintain the spacer member in the working position and the idle position.

6 Claims, 3 Drawing Sheets

HITCH FOR TWO DRAWPIN SIZES

This invention is in the field of towed vehicles, such as trailers and agricultural implements, and in particular hitch mechanisms for attaching such towed vehicles to a towing vehicle.

BACKGROUND

Clevis and tongue connections are known for connecting a towed vehicle such as a trailer or agricultural implement to a towing vehicle. A problem with such connections is that the drawpin holes in the upper and lower clevis members and the drawpin hole in the tongue extending between them are very often of different sizes.

For example in agriculture, an implement is typically hitched to a tractor drawbar by a clevis and tongue connection. The clevis provides an upper and lower clevis members each defining a drawpin hole, and the tongue defines a drawpin hole and is inserted between the clevis members to align the drawpin holes such that a drawpin can be inserted through them and thereby connect the clevis and tongue. Where the drawpin holes are the same size, a corresponding size of drawpin can be inserted to connect the clevis and tongue in the preferred manner such that there is only minimal movement at the connection.

The clevis may be mounted to the tractor drawbar and the tongue mounted to the implement hitch, or vice versa. Tractors come in a wide variety of sizes, and the tractor drawpin hole is typically sized for a pin of sufficient strength to match the power of the tractor. Implements also come in a wide variety, and similarly have a hitch with a drawpin hole that is sized for a pin of sufficient strength to match the power requirement of the implement. There has been some standardization in the agricultural implement industry, with hitches categorized by size. For example a Category 5 implement hitch will have a 2¾" (inch) diameter drawpin, a Category 4 will have a 2¼" drawpin, and so on.

Since there are typically a limited number of tractors on a farm that are required to tow a wide variety of implements, often the drawpin holes are of different sizes, and a drawpin that fits through the smaller of the holes must be used. The implement and tractor are thus connected by a loose fitting connection that allows significant movement. Control of the implement is thus reduced, and undesirable shock forces are exerted on the drawpin, implement hitch, and tractor drawbar during use, causing excessive wear.

Similarly trailers are commonly attached to a towing vehicle by a pintle hook and ring mechanism. The pintle hook is typically mounted to the towing vehicle, and a ring member is attached to the trailer hitch and drops over the ring member onto the pintle hook to connect the trailer and towing vehicle. The ring member defines a pintle hook aperture into which the pintle hook must fit. Similar to the clevis and tongue mechanism, it is desirable to have the pintle hook aperture fit the pintle hook quite closely.

This problem has been addressed for example in U.S. Pat. No. 5,671,938 to the present inventor Olson. The disclosed implement hitch provides a hitch member defining a drawpin hole that is adjustable by moving a back portion of the hitch member forward and rearward by securing a variety of spacers in the hitch member, or by securing in the hitch member an auxiliary member that defines a smaller drawpin hole. The disclosed hitch requires considerable machining to make, and as well it also requires a significant amount of time to change the size of the drawpin hole.

United States Published Patent Application 2007/0052207 also of the present inventor Olson, discloses implement hitches that provide a hitch member defining a drawpin hole that is adjustable by moving a spacer forward into and rearward out of the rear portion of the drawpin hole. The spacer can be moved incrementally by turning a threaded actuator to accommodate a drawpin of any size.

SUMMARY OF THE INVENTION

It is an object of the present invention to provide a hitch apparatus for two different drawpin sizes that overcomes problems in the prior art.

In a first embodiment the present invention provides a hitch apparatus comprising a hitch member defining a drawpin hole extending substantially vertically therethrough. A spacer member is movably mounted to the hitch member such that the spacer member is movable laterally from a working position, where the spacer extends forward to block a rear portion of the drawpin hole, to an idle position where the spacer is removed from the drawpin hole and the front end of the spacer is located lateral to the drawpin. A lock mechanism is operative to selectively maintain the spacer member in the working position and the idle position.

In a second embodiment the present invention provides a hitch apparatus comprising a hitch member defining a drawpin hole extending substantially vertically therethrough. A spacer member is pivotally mounted to the hitch member by a bolt located rearward of the drawpin hole such that the spacer member is movable laterally from a working position, where the spacer extends forward to block a rear portion of the drawpin hole such that a first drawpin can be inserted in the drawpin hole between a front end of the spacer member and a front edge of the drawpin hole, to an idle position, where the spacer is removed from the drawpin hole and the front end of the spacer is located lateral to the drawpin hole such that a second drawpin can be inserted in the drawpin hole between the front edge of the drawpin hole and a rear edge of the drawpin hole. A lock mechanism is operative to selectively maintain the spacer member in the working position and the idle position.

The hitch apparatus of the present invention allows a single hitch member to accommodate two sizes of drawpin. Typically the hitch apparatus will be configured to accommodate a drawpin of one category with the spacer member in the idle position, and a drawpin of the next smaller category with the spacer member in the working position. Thus a Category 5 hitch member will have a 2¾" drawpin. The spacer member is mounted at the rear of the drawpin hole, and when in the working position will extend from the rear edge of the drawpin hole a distance of ¾" into the drawpin hole, such that a Category 4 drawpin, with a diameter of 2", will fit snugly between the front edge of the drawpin hole and the front edge of the spacer member. Similarly a Category 4 hitch member can be converted for use with a smaller Category 3 drawpin, or an even smaller Category 2 drawpin if circumstances so require.

When moving in the forward direction with the spacer in the working position, the towing force is exerted on the front edge of the drawpin hole, and the spacer member experiences only relatively minor forces. When moving in reverse the force exerted by the towing vehicle is exerted an the spacer member, however operation in reverse is not typically at high speed, at full force, or for extended periods. The design of the hitch apparatus will need to address conditions of use where considerable reverse operation is required, and the hitch apparatus may not always be suitable for such applications.

In one embodiment the hitch apparatus comprises a bolt hole extending substantially vertically through the hitch member rearward of the drawpin hole. The spacer member comprises a spacer plate with a pivot hole through a rear portion thereof. A bolt is inserted through the pivot hole in the plate, and through the bolt hole. Conveniently the plate will be placed on top of the hitch member, and the bolt inserted down through the pivot and bolt holes. A spring is placed on the bolt, either above the plate or under the hitch member, and a nut is threaded on the end of the belt and tightened so that the bolt and spring exert a downward bias force on the plate toward the hitch member. The plate is configured such that when the plate is attached to the hitch member by the bolt, and moved into the working position where the plate extends forward into the rear portion of the drawpin hole, the front edge of the plate is at the required distance from the front edge of the drawpin hole to snugly accommodate a drawpin of the desired diameter.

A lug is fixed to the underside of the spacer plate and is configured to extend downward into the drawpin hole when the plate is in the working position, such that the plate is prevented from pivoting laterally and thus moving out of the drawpin hole. The downward bias force exerted on the plate by the spring and bolt prevents the plate from inadvertently moving vertically. When it is desired however, an operator can lift the plate against the bias force such that the bottom of the lug is above the top of the hitch member, and thus can move the plate laterally to the idle position where the spacer plate is removed from the drawpin hole, and instead extends laterally. The lug is configured such that when the plate is moved laterally toward the idle position, the lug moves across the portion of the hitch member between the drawpin hole and the edge of the hitch member, and when the lug moves past the edge of the hitch member the plate can be released and the bias force will move the plate down such that the lug is lateral to the hitch member, and so the plate is prevented from moving back toward the working position until an operator again lifts the plate.

Thus no tools are required to adjusted the hitch apparatus from a first size of drawpin to a second size of drawpin—the adjustment is made in seconds by simply lifting the spacer plate and moving it laterally in one direction or the other. While only two sizes of drawpin are provided for, it is contemplated that adjusting the drawpin hole between sizes to accommodate drawpins of two categories of agricultural implement for example will provide considerable benefits, especially considering the simplicity and speed of operation of the present apparatus compared to the prior art.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
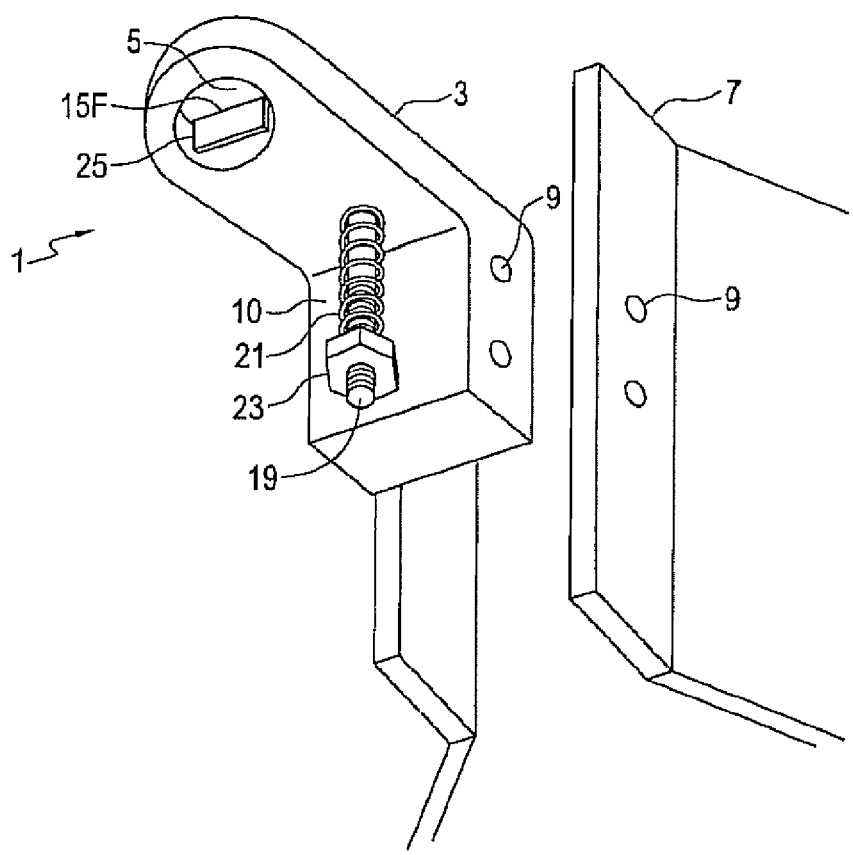
FIG. 1 is a bottom perspective view of an embodiment of a hitch apparatus of the present invention with the spacer member in the working position.

FIGS. 1-4 illustrate a hitch apparatus 1 of the present invention. The apparatus comprises a hitch member 3 defining a drawpin hole 5 extending substantially vertically therethrough. The hitch member is adapted for attachment to the frame 7 of an implement by pins or bolts through holes 9 in the hitch member 3 and frame 7. A spacer member 11 is movably mounted to the hitch member 3, and is movable laterally from a working position illustrated in FIG. 2, where the spacer member 11, provided by a spacer plate 15, extends forward to block a rear portion of the drawpin hole 5, to an idle position illustrated in FIG. 3, where the spacer plate 15 is removed from the drawpin hole 5 and the front end 15F of the spacer plate 15 is located lateral to the drawpin hole 5. A lock mechanism 10 is provided to maintain the spacer member 11 in either the working or idle positions as desired.

Figure 2:
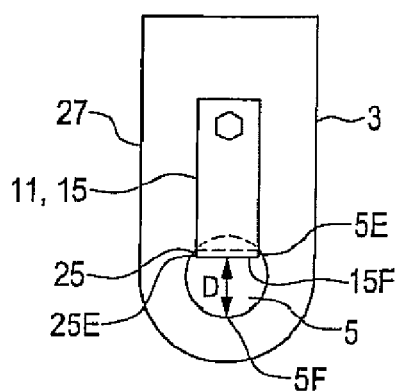
FIG. 2 is a top view of the embodiment of FIG. 1 with the spacer member in the working position.

When the spacer plate 15 is in the working position of FIG. 2 a first drawpin with a diameter D can be inserted in the drawpin hole 5 between the front end 15F of the spacer plate 15 and a front edge 5F of the drawpin hole 5. When the spacer plate 15 is in the idle position of FIG. 3 the spacer plate 15 is removed from the drawpin hole 5 and the front end of the spacer plate 15 is located lateral to the drawpin hole 5 such that a second drawpin with a larger diameter D' can be inserted in the drawpin hole 5 between the front edge 5F of the drawpin hole 5 and the rear edge of the drawpin hole 5.

In the illustrated embodiment the hitch apparatus 1 comprises a bolt hole 13 extending substantially vertically through the hitch member 3 rearward of the drawpin hole 5. The spacer member 11 is provided by a spacer plate 15 with a pivot hole 17 through a rear portion thereof. A bolt 19 is inserted through the pivot hole 17 in the plate 15, and through the bolt hole 13. Conveniently as illustrated the plate 15 will be placed on top of the hitch member 3, and the bolt 19 inserted down through the pivot and bolt holes 17, 13. It is also contemplated that the spacer plate could be on the bottom side of the hitch member 3.

A spring 21 is placed on the bolt 19, and a nut 23 is threaded on the end of the bolt 19 and tightened so that the spring 21, through the bolt 19, exerts a downward bias force BF on the plate 15 toward the hitch member 3. It is contemplated that the spring 21 could be either above or below the hitch member 3, and it is further contemplated that the plate 15 could also be placed on the bottom side of the hitch member 3 if desired. The illustrated embodiment shows one convenient configuration.

The plate 15 is configured such that when the plate 15 is attached to the hitch member 3 by the bolt 19, and moved into the working position of FIG. 2 where the plate 15 extends forward into the rear portion of the drawpin hole 5, the front edge 15F of the plate 15 is at the required distance D from the front edge 5F of the drawpin hole 5 to snugly accommodate a drawpin of the desired diameter.

Figure 5:
FIG. 5 is a side view of an alternate spacer plate.

A lug 25 is fixed to the underside of the spacer plate 15 and is configured to extend downward into the drawpin hole 5 when the plate 15 is in the working position as illustrated in FIG. 2. The lug 25 prevents the plate 15 from pivoting laterally and thus moving out of the drawpin hole 5. In the embodiment of FIGS. 1-4 the lug 25 is conveniently provided by simply bending down the front end of the plate 15, however the lug could be provided instead by welding or otherwise attaching a protruding member to the underside of the plate 15. An alternate embodiment of a plate 115 with such a lug 125 is illustrated in FIG. 5.

When moving in reverse the force exerted by the towing vehicle through the drawpin is exerted on the front end of the spacer plate 15, 115. The lug 25 or 125 can be configured to bear against the rear edge of the drawpin hole 5, 105 when in the working position so that when operating in reverse the force exerted by the drawpin is exerted through the lug 25, 125 to the hitch member, rather than being borne directly by the bolt 19. It can be seen for example in the working position illustrated in FIG. 2 that the ends 25E of the lug 25 bear against the edge 5E of the drawpin hole 5, and so transfer rearward forces exerted by a drawpin on the front edge 15F of the spacer plate 15 to the hitch member 3. The lug 25 could also be configured to bear against a larger arc of the rear edge of the drawpin hole 5 where reverse forces are more severe.

The downward bias force BF exerted on the plate 15 by the spring 21 through the bolt 19 prevents the plate 15 from inadvertently moving vertically such that the lug 25 can clear the top of the hitch member 3 and allow the plate 15 to move laterally out of the working position. The spring 21, bolt 19, and lug 25 provide a lock mechanism 10 that is operative to maintain the spacer plate 15 in either the working or idle positions as desired.

Figure 3:
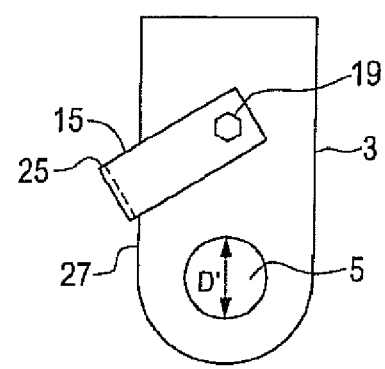
FIG. 3 is a top view of the embodiment of FIG. 1 with the spacer member in the idle position.
Figure 4:
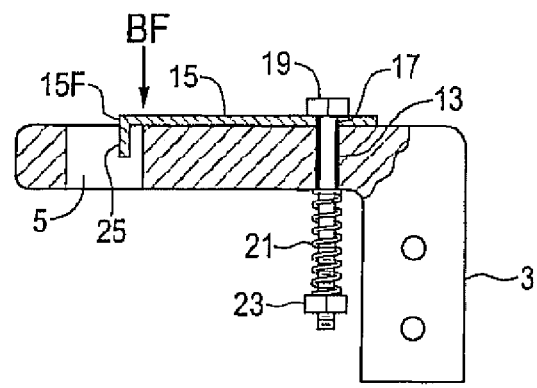
FIG. 4 is a schematic cutaway side view of the embodiment of FIG. 1 with the spacer member in the working position.

To use a larger size drawpin with a diameter D', an operator lifts the plate 15 against the bias force BF such that the bottom of the lug 25 is above the top of the hitch member 3, and moves the plate 15 laterally to the idle position of FIG. 3 where the spacer plate 15 is removed from the drawpin hole 5, and instead extends laterally. The lug 25 is configured such that when the plate 15 is moved laterally toward the idle position the lug 25 moves across the portion of the hitch member 3 between the drawpin hole 5 and the edge 27 of the hitch member 3, and when the lug 25 moves past the edge 27 of the hitch member 3 the plate 15 can be released and the bias force BF will move the plate 15 down such that the lug 25 is lateral to the hitch member 31 and so the plate 15 is prevented from moving back toward the working position until an operator again lifts the plate 15.

Figure 6:
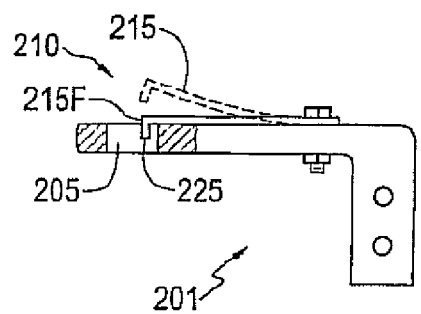
FIG. 6 is a side view of an alternate embodiment of the apparatus with the spacer member in the working position.

FIG. 6 illustrates an alternate embodiment of the apparatus 201 where the lock mechanism 210 is provided by a spring steel spacer plate 215 that resists upward movement of the front end 215F of the spacer plate, and thus maintains the lug 225 in the drawpin hole 205.

Figure 7:
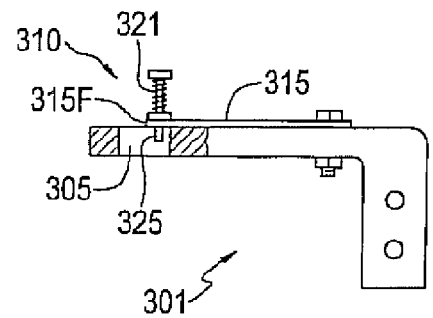
FIG. 7 is a side view of a further alternate embodiment of the apparatus with the spacer member in the working position.

FIG. 7 illustrates a further alternate embodiment of the apparatus 301 where the lock mechanism 310 is provided by a spring biased pin 325 near the forward end 315F of the spacer plate 315. The pin 325 is biased downward into the drawpin hole 305 by a spring 321. The pin 325 can be moved upward against the bias force of the spring 321 to move the plate 315 laterally out of the drawpin hole 305.

Figure 8:
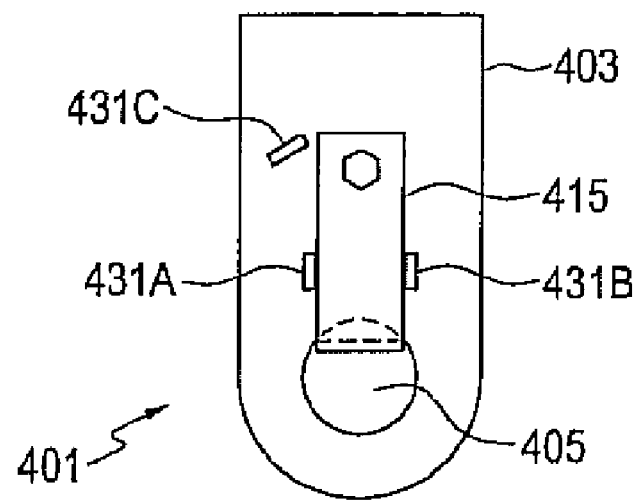
FIG. 8 is a top view of an alternate embodiment of a hitch apparatus of the present invention with the spacer member in the working position.
Figure 9:
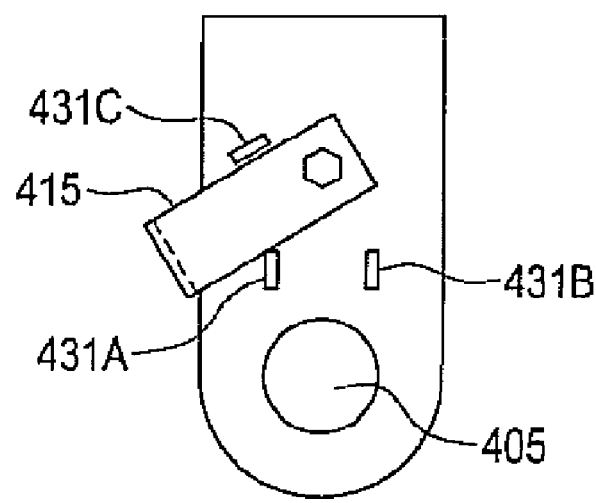
FIG. 9 is a top view of the alternate embodiment of FIG. 8 with the spacer member in the idle position.

FIGS. 8 and 9 illustrate an alternate hitch apparatus 401 where the lock mechanism comprises a bias element as described above, but where, instead of a lug on the front end of the spacer member 415, raised ridges 431A, 431B, 431C are provided on the hitch member 403. The ridges are configured such that the spacer member 415 must be raised against the bias force as described above in order to move the spacer plate 415 laterally away from the drawpin hole 405 and out of the working position of FIG. 8 between ridges 431A and 431B, and into the idle position of FIG. 9 between ridges 431A and 431C.

The hitch apparatus 1 of the present invention thus allows a single hitch member 3 to accommodate two sizes of drawpin, one having a diameter D and the other having a larger diameter D'.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A hitch apparatus comprising:
a hitch member defining a drawpin hole extending substantially vertically therethrough;
a spacer member movably mounted to the hitch member such that the spacer member is movable laterally from a working position, where the spacer member extends forward to block a rear portion of the drawpin hole, to an idle position where the spacer member is removed from the drawpin hole and a front end of the spacer is located lateral to the drawpin hole; and
a lock mechanism operative to selectively maintain the spacer member in the working position and the idle position, the lock mechanism provided by a lug extending from the spacer member into the drawpin hole between front and rear edges of the drawpin hole, and a bias element exerting a bias force that urges the lug into the drawpin hole;
wherein the spacer member is pivotally mounted to the hitch member by a bolt located rearward of the drawpin hole, and wherein the lug is movable substantially vertically with respect to the spacer member, and wherein the bias element comprises a spring urging the lug into the drawpin hole.

2. A hitch apparatus comprising:
a hitch member defining a drawpin hole extending substantially vertically therethrough;
a spacer member movably mounted to the hitch member such that the spacer member is movable laterally from a working position, where the spacer member extends forward to block a rear portion of the drawpin hole, to an idle position where the spacer member is removed from the drawpin hole and a front end of the spacer is located lateral to the drawpin hole; and
a lock mechanism operative to selectively maintain the spacer member in the working position and the idle position, the lock mechanism provided by a lug extending from the spacer member into the drawpin hole between front and rear edges of the drawpin hole, and a bias element exerting a bias force that urges the lug into the drawpin hole;
wherein a rearward force on the spacer member causes the lug to bear against the rear edge of the drawpin hole such that the rearward force on the lug is transferred to the hitch member.

3. A hitch apparatus comprising:
a hitch member defining a drawpin hole extending substantially vertically therethrough;
a spacer member movably mounted to the hitch member such that the spacer member is movable laterally from a working position, where the spacer member extends forward to block a rear portion of the drawpin hole, to an idle position where the spacer member is removed from the drawpin hole and a front end of the spacer is located lateral to the drawpin hole; and a lock mechanism operative to selectively maintain the spacer member in the working position and the idle position wherein the lock mechanism comprises raised ridges on the hitch member configured such that the spacer member must be raised against a bias force over at least one ridge in order to move the spacer member laterally out of the working position and into the idle position.

4. A hitch apparatus comprising:

a hitch member defining a drawpin hole extending substantially vertically therethrough;

a spacer member pivotally mounted to the hitch member by a bolt located rearward of the drawpin hole such that the spacer member is movable laterally from a working position, where the spacer member extends forward to block a rear portion of the drawpin hole such that a first drawpin can be inserted in the drawpin hole between a front end of the spacer member and a front edge of the drawpin hole, to an idle position, where the spacer member is removed from the drawpin hole and the front end of the spacer member is located lateral to the drawpin hole such that a second drawpin can be inserted in the drawpin hole between the front edge of the drawpin hole and a rear edge of the drawpin hole; and a lock mechanism operative to selectively maintain the spacer member in the working position and the idle position, the lock mechanism provided by a lug extending from the spacer member into the drawpin hole between the front and rear edges of the drawpin hole, and a bias element exerting a bias force that urges the lug into the drawpin hole;

wherein the lug is movable substantially vertically with respect to the spacer member, and wherein the bias element comprises a spring urging the lug into the drawpin hole.

5. A hitch apparatus comprising:

a hitch member defining a drawpin hole extending substantially vertically therethrough;

a spacer member pivotally mounted to the hitch member by a bolt located rearward of the drawpin hole such that the spacer member is movable laterally from a working position, where the spacer member extends forward to block a rear portion of the drawpin hole such that a first drawpin can be inserted in the drawpin hole between a front end of the spacer member and a front edge of the drawpin hole, to an idle position, where the spacer member is removed from the drawpin hole and the front end of the spacer member is located lateral to the drawpin hole such that a second drawpin can be inserted in the drawpin hole between the front edge of the drawpin hole and a rear edge of the drawpin hole; and a lock mechanism operative to selectively maintain the spacer member in the working position and the idle position, the lock mechanism provided by a lug extending from the spacer member into the drawpin hole between the front and rear edges of the drawpin hole, and a bias element exerting a bias force that urges the lug into the drawpin hole;

wherein a rearward force on the spacer member causes the lug to bear against the rear edge of the drawpin hole such that the rearward force on the lug is transferred to the hitch member.

6. A hitch apparatus comprising:

a hitch member defining a drawpin hole extending substantially vertically therethrough;

a spacer member pivotally mounted to the hitch member by a bolt located rearward of the drawpin hole such that the spacer member is movable laterally from a working position, where the spacer member extends forward to block a rear portion of the drawpin hole such that a first drawpin can be inserted in the drawpin hole between a front end of the spacer member and a front edge of the drawpin hole, to an idle position, where the spacer member is removed from the drawpin hole and the front end of the spacer member is located lateral to the drawpin hole such that a second drawpin can be inserted in the drawpin hole between the front edge of the drawpin hole and a rear edge of the drawpin hole; and a lock mechanism operative to selectively maintain the spacer member in the working position and the idle position;

wherein the lock mechanism comprises a bias element exerting a bias force urging the spacer member against the hitch member, and raised ridges on the hitch member configured such that the spacer member must be raised against the bias force over at least one ridge in order to move the spacer member laterally out of the working position and into the idle position.

* * * * *